(12) United States Patent
Soubramanien et al.

(10) Patent No.: US 8,874,550 B1
(45) Date of Patent: Oct. 28, 2014

(54) METHOD AND APPARATUS FOR SECURITY INFORMATION VISUALIZATION

(75) Inventors: Viswa Soubramanien, Cupertino, CA (US); Peter Shaohong Wei, Sunnyvale, CA (US); Mayuresh Ektare, Santa Clara, CA (US); Howard Chen, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 449 days.

(21) Appl. No.: 12/783,479

(22) Filed: May 19, 2010

(51) Int. Cl.
  *G06F 7/00* (2006.01)
  *G06F 17/30* (2006.01)

(52) U.S. Cl.
  USPC .......... 707/722; 707/708; 707/731; 707/748; 707/771; 707/999.003

(58) Field of Classification Search
  CPC .......... G06F 17/30011; G06F 17/3028; G06F 17/3079; G06F 17/30873
  See application file for complete search history.

(56) References Cited

U.S. PATENT DOCUMENTS

| 7,843,491 | B2 * | 11/2010 | Vallone et al. | 348/143 |
| 2004/0260947 | A1 * | 12/2004 | Brady et al. | 713/201 |
| 2007/0118491 | A1 | 5/2007 | Baum et al. | |
| 2010/0100964 | A1 * | 4/2010 | Mahaffey et al. | 726/25 |
| 2011/0099500 | A1 * | 4/2011 | Smith et al. | 715/771 |
| 2011/0167011 | A1 * | 7/2011 | Paltenghe et al. | 705/320 |

OTHER PUBLICATIONS

Wolfram Alpha—Making the World's Knowledge Computable; 2010 Wolfram Alpha LLC—a Wolfram Research Company; 1 sheet, webpage [online][retrieved on Mar. 26, 2010]. Retrieved from the Internet: http://www.wolframalpha.com/.
Wolfram Alpha—Wikipedia, the free encyclopedia; 4 sheets [retrieved on Mar. 26, 2010]. Retrieved from the internet: http://en.wikipedia.org/wiki/Wolfram_Alpha.
Security event manager—Wikipedia, the free encyclopedia, 2 sheets [retrieved on Mar. 25, 2010]. Retrieved from the internet: http://en.wikipedia.org/wiki/Security_event_manager.
David Swift "A Practical Application of SIM/SEM/SIEM Automating Threat Identification", Dec. 23, 2006, pp. 1-38, SANS Institute InfoSec Reading Room, 2007.

* cited by examiner

*Primary Examiner* — Azam Cheema
(74) *Attorney, Agent, or Firm* — Okamoto & Benedicto LLP

(57) ABSTRACT

Visualization for presenting event information indicative of a computer security threat is automatically selected from available visualizations. Event information received from data sources is assigned a category prior to being stored in an event log. The event log may be searched for relevant event information using the assigned categories. Visualizations applicable to the relevant event information are retrieved and given an importance score, which may be based on execution of prioritization algorithms using corresponding relevant event information. The retrieved visualizations are ranked based on their importance scores. One or more retrieved visualizations that have the best importance scores relative to other retrieved visualization are selected for rendering.

2 Claims, 9 Drawing Sheets

METHOD AND APPARATUS FOR SECURITY INFORMATION VISUALIZATION

BACKGROUND OF THE INVENTION

1. Field of the Invention

The present invention relates generally to computer systems, and more particularly but not exclusively to computer security.

2. Description of the Background Art

Various components of a computer network generate event information indicative of computer security threat or security posture. Sources of event information may include operating systems, databases, network security devices, networking devices, endpoint security software, and various applications. Security information and event management (SIEM) techniques may be used to gather event information into an event log, correlate the event information, perform notifications, allow for interactive event management functions (e.g., queries, drilldown, diagnostics), and generate event reports. Event reports allow administrators to evaluate their networks for existing or emerging security threats, and manage network security in general. Unfortunately, because of the huge volume of event information and possible ways of presenting the event information, event reports are not only relatively complex to generate but are also difficult to efficiently mine for critical information.

SUMMARY

In one embodiment, visualization for presenting event information indicative of a computer security threat is automatically selected from available visualizations. Event information received from data sources is assigned a category prior to being stored in an event log. The event log may be searched for relevant event information using the assigned categories. Visualizations applicable to the relevant event information are retrieved and given an importance score, which may be based on execution of prioritization algorithms using corresponding relevant event information. The retrieved visualizations are ranked based on their importance scores. One or more retrieved visualizations that have the best importance scores relative to other retrieved visualization are selected for rendering.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored non-transitory in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. As can be appreciated, software components are executed by a processor to perform computational and other data processing steps, which may include receiving inputs, storage and retrieval of information from a storage device, transfer of data over a computer network and so on. Software components may be implemented in logic circuits, for example. Components may be implemented separately in multiple modules or together in a single module.

Figure 1:
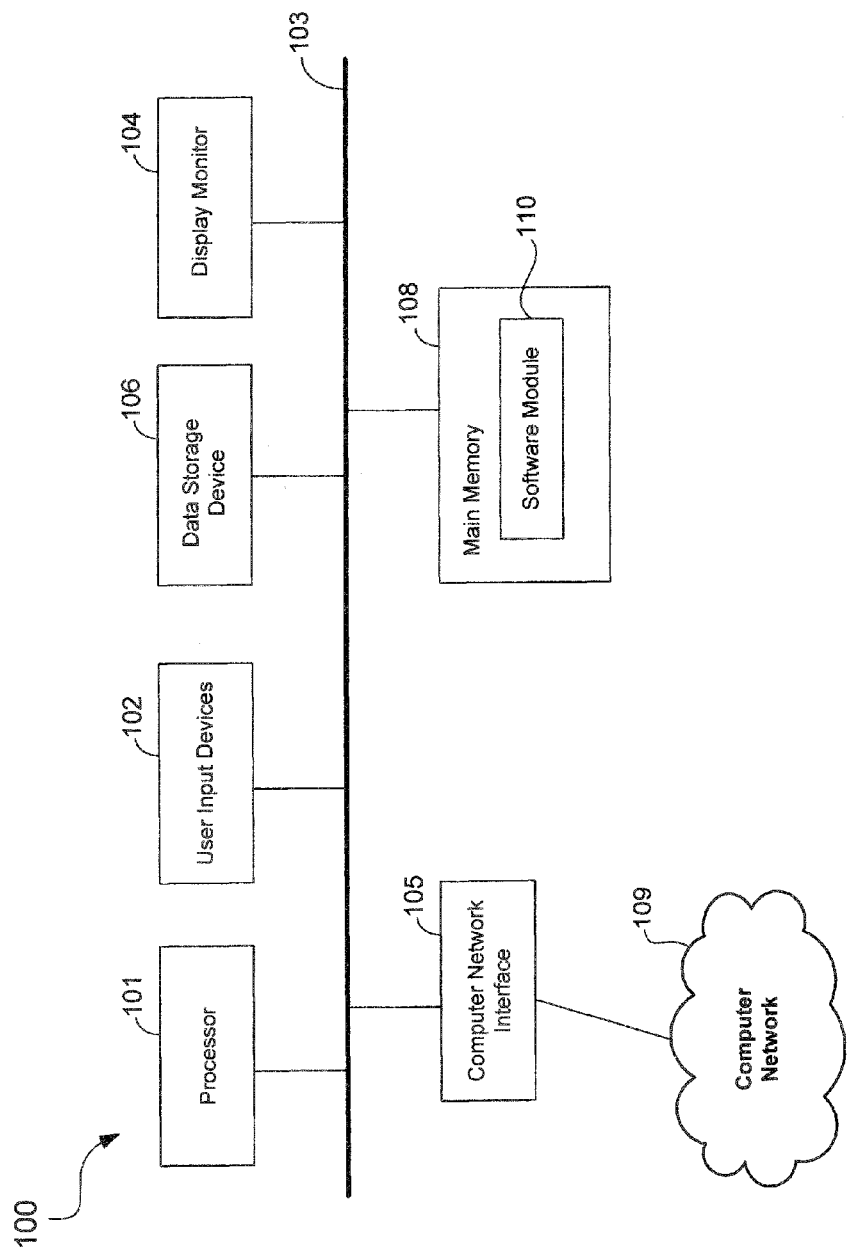
FIG. 1 shows a schematic diagram of a computer in accordance with an embodiment of the present invention.

FIG. 1 shows a schematic diagram of a computer 100 in accordance with an embodiment of the present invention. The computer 100 may be employed as an event server computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110, which may comprise computer-readable program code components of an event server computer. The software modules 110 may be loaded from the data storage device 106 to the main memory 108 for execution by the processor 101.

Figure 2:
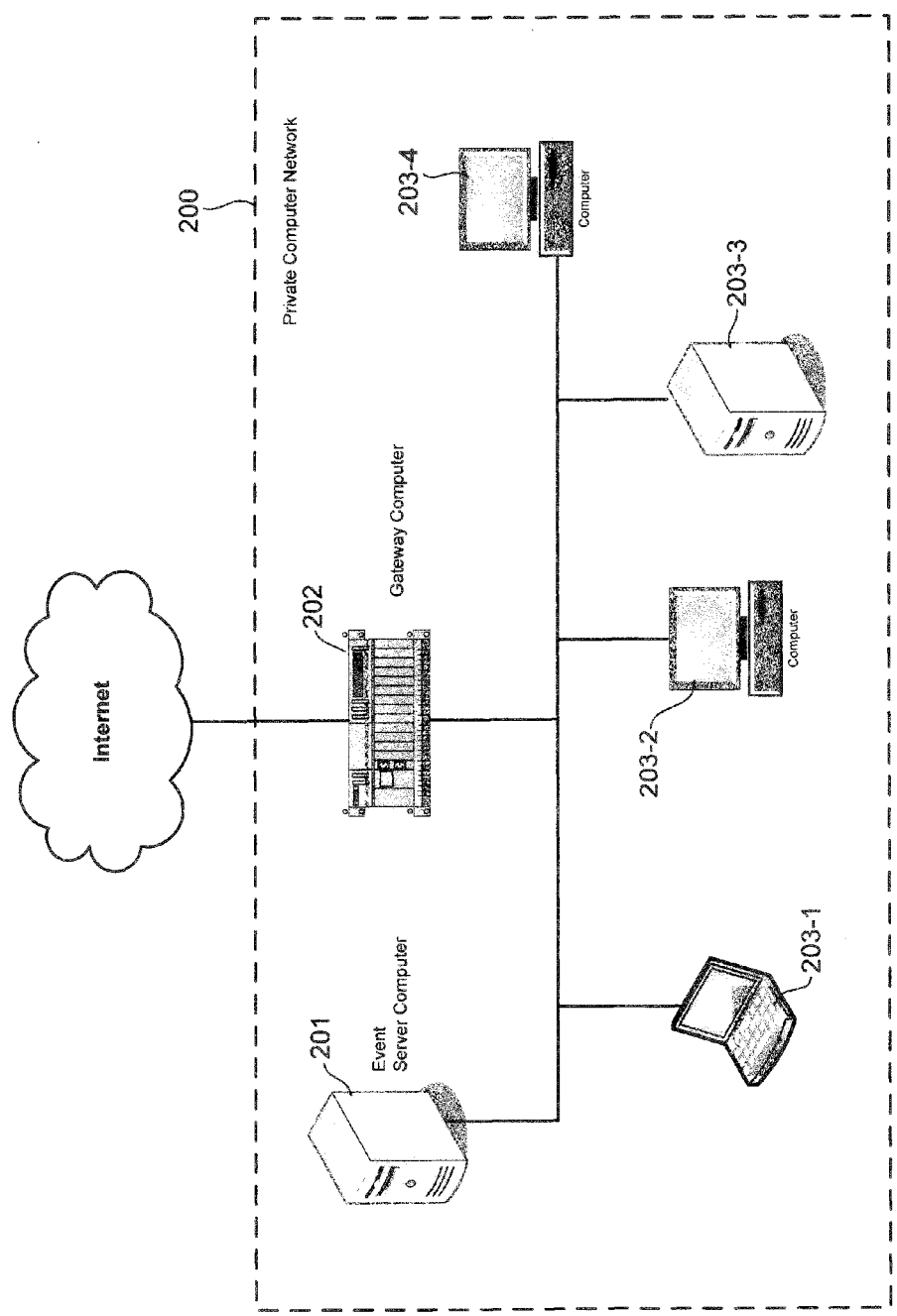
FIG. 2 schematically shows a private computer network in accordance with an embodiment of the present invention.

FIG. 2 schematically shows a private computer network 200 in accordance with an embodiment of the present invention. The private computer network 200 includes an event server computer 201, a gateway computer 202, a plurality of computers 203 (i.e., 203-1, 203-2, 203-3, 203-4, etc.), and other components not specifically shown. The gateway computer 202 provides Internet connectivity to the components of the private computer network 200.

Figure 3:
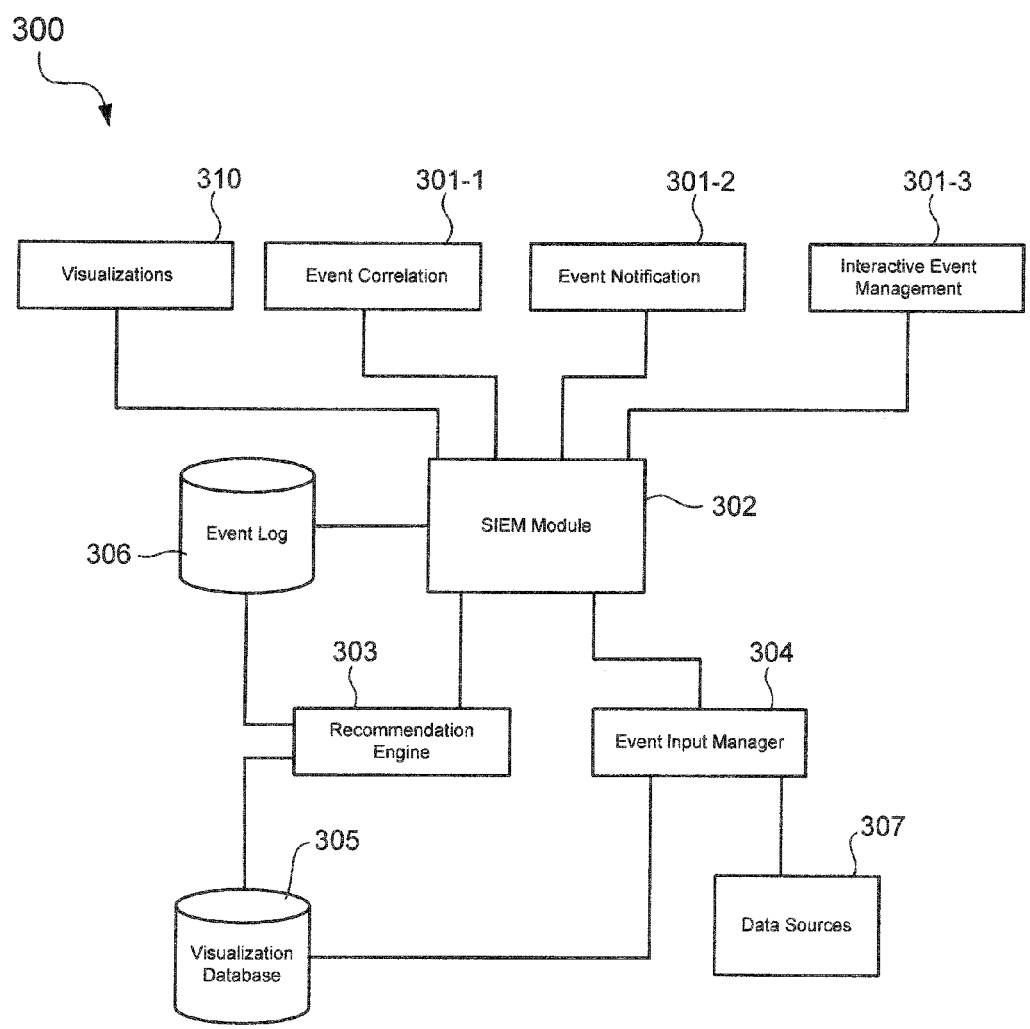
FIG. 3 schematically shows a security information and event management system in accordance with an embodiment of the present invention.

FIG. 3 schematically shows a security information and event management (SIEM) system 300 in accordance with an embodiment of the present invention. In one embodiment, the event server computer 201 (see FIG. 2) is configured to implement the system 300. For example, the event server computer 201 may be programmed to include and execute the components of the system 300. As can be appreciated, the system 300 may also be implemented in other computers, including the gateway computer 202. In the example of FIG. 3, the system 300 includes an SIEM module 302, a recommendation engine 303, an event input manager 304, a visualization database 305, and an event log 306.

The SIEM module 302 may comprise computer-readable program code for performing the functions 301 (i.e., 301-1, 301-2, 301-3) and presenting visualizations (labeled as 310) using event information received from data sources 307. The data sources 307 may include operating systems, databases, network security devices, networking devices, antivirus, endpoint security software, and various applications. The event information may indicate detection of viruses, network accesses of users of the computer network, detection of intrusions, web accesses to prohibited websites on the Internet and other events that implicate computer security. The SIEM module 300 may be configured to process and manage received event information to perform event correlation (labeled as 301-1), notify designated computers or individuals about certain events (labeled as 301-2), and allow for interactive event management (labeled as 301-3). The SIEM module 302 may employ conventional SIEM techniques to perform the just mentioned functions 301. As will be more apparent below, the SIEM module 302 may automatically select and present visualizations in accordance with embodiments of the present invention.

In the example of FIG. 3, an event input manager 304 receives event information from the data sources 307 and processes the event information before providing the event information to the SIEM module 302. The event input manager 304 may comprise computer-readable program code configured to receive event information from a plurality of data sources and attach or associate category or domain information to the event information. The event input manager 304 may process incoming event information to include category or domain information, and provide the processed event information to the SIEM module 302. The SIEM module 302 receives the processed event information for storage in the event log 306.

The recommendation engine 303 may comprise computer-readable program code configured to recommend the most relevant visualization for use in presenting event information. A visualization comprises a format for presenting information. A visualization may comprise a report, a search result, dashboard, metric, method or other means for presenting information. Visualizations may be employed to present event information in graphical, pictorial, or text-based format viewable on a computer screen or printout or readable by a computer for further processing. The recommendation engine 303 may be configured to recommend one or more visualizations from a plurality of visualizations appropriate to event information to be presented. The SIEM module 302 receives the recommended visualizations from the recommendation engine 303 for selection and rendering.

The visualization database 305 may comprise visualizations and other information employed by the recommendation engine 303 to evaluate visualizations and by the event input manager 304 to process incoming event information. The visualization database 305 and the event log 306 may be stored in local storage (e.g., data storage device of the event server computer 201) or remote storage accessible over a computer network.

Figure 4:
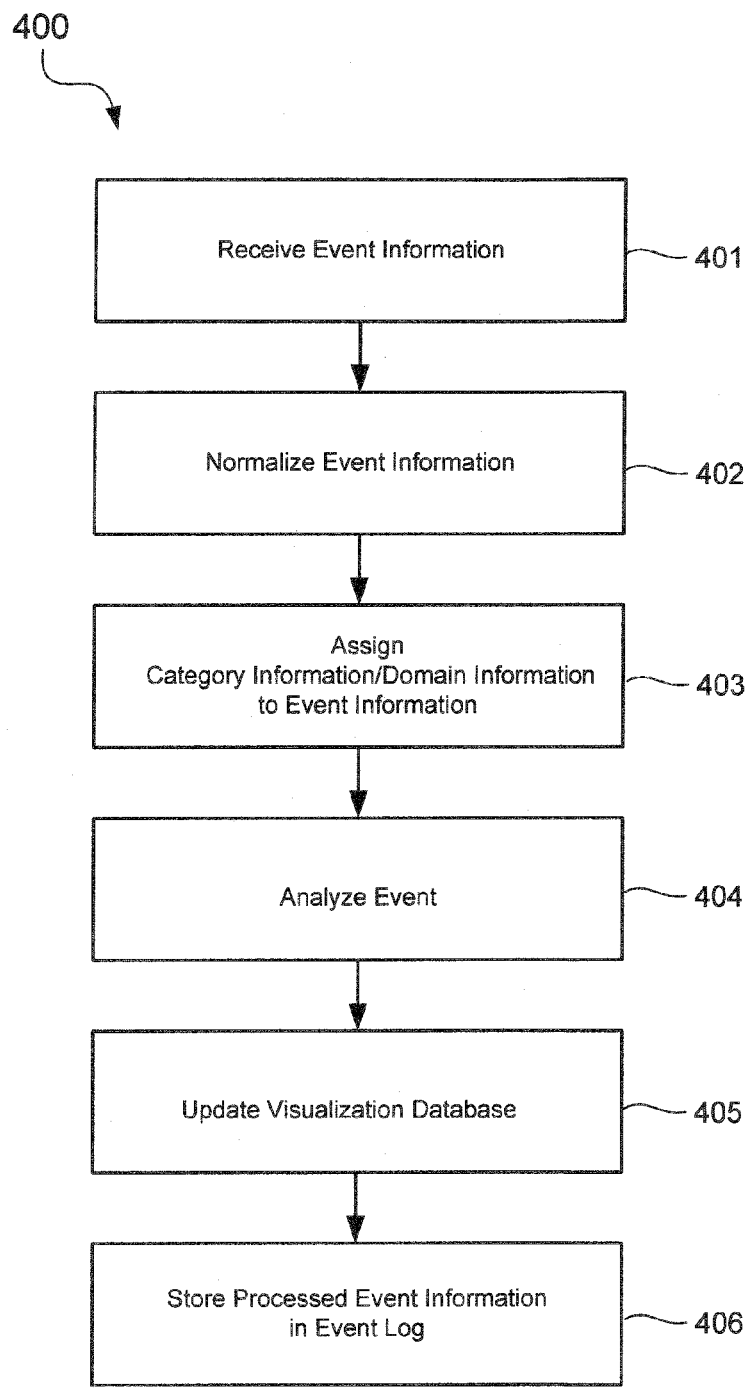
FIG. 4 shows a flow diagram of a method of presenting computer security event information in accordance with an embodiment of the present invention.

Referring now to FIG. 4, there is shown a flow diagram of a method 400 of presenting computer security event information in accordance with an embodiment of the present invention. In the example of FIG. 4, steps 401-403 may be performed by the event input manager 304, and the steps 404-406 may be performed by or for the SIEM module 302.

The method 400 begins with the event input manager 304 receiving event information from various data sources 307 (step 401). The event information may include computer security related information, such as an alert from an antivirus that it has detected malicious code in a particular computer, detection of denial of service attack by a gateway computer, etc. Example event information is shown in Table 1, where someone tried but failed to logon to the system.

TABLE 1

Apr 30 2010 15:17:29 (us-vich-xp) AUDIT_FAILURE(529): NT US-VICH-XP Logon Failure Unknown user name or bad password    user: company\vich    trendus 7 User32 Authentication Package: Negotiate    US-VICH-XP The event input manager 304 normalizes the event information to convert the event information into a standardized format for efficient searching and processing (step 402). In one embodiment, the event input manager 304 parses and reformats the event information into key-value pairs. The key may be a field recognized and sought by the event input manager 304, such as timestamp, domain name, IP address, user name, computer name, event type, destination IP, destination URL/IP, among others. For example, for a particular event information, the event input manager 304 may extract the timestamp on when the event was detected, the name of the user involved in the event, the name of the computer involved in the event, and so on. As a particular example, the key-value pair may be "timestamp: 3/24/2010-23:30" for an event that occurred on Mar. 24, 2010, at 11:30 PM. Table 2 shows the event information of Table 1 after normalization by the event input manager 304. In the example of Table 2, the event input manager 304 extracted the values for the fields Log Time, Product, Event, Operating System, etc. from the event information of Table 1.

TABLE 2

LogTime: Apr 30 3020 15:17:29
Product:Windows
Event: Logon_FAILURE
OperatingSystem: NT
HostName: US-VICH-XP
FailureReason: Unknown user name or bad password
User Name: vich
Domain: company

TABLE 2-continued

Logon Type: 7
Logon Process: User32
Authentication Package: Negotiate
Workstation Name: US-VICH-XP]

The event input manager 304 assigns one or more category information and/or domain information to the event information (step 403). The category information indicates the category of the event information. Example categories for event information include "malware" for event information pertaining to malicious codes, "endpoint" for event information pertaining to a particular computer, "violations" for event information pertaining to access violations, and "users" for event information pertaining to users. Other categories for event information include access control, rule violation, and malware detections. A particular event information may have several category information or domain information.

For event information comprising structured data, the category may be obtained from meta information available from the schema of the event information. This allows for relative ease in mapping of columns to categories and domains. For example, antivirus software may be expected to generate event information in a certain format that indicates the "malware" category when detecting malicious code in a particular computer. As another example, a gateway computer may be expected to generate event information in a certain format that indicates the event information is under the category "access violation" upon detection of intrusion into the network.

For event information comprising unstructured or structured data, category information may be retrieved from normalized event information. Categorization logic comprising static rules, such are regular expressions, may be employed to extract a category from normalized event information. For example, the regular expression "<match>^[Unknown user]</match>" may be employed to find the category "[Authentication Failure]" from the listing of normalized event information of Table 2. The categorization logic may also employ more dynamic rules based on lexical and semantic analysis to retrieve category information from normalized event information.

The category information may be included with the corresponding event information in the event log. Table 3 shows the normalized event information listing of Table 2 after category information and/or domain information is attached to corresponding event information. In the example of Table 3, the event category information "Authentication" and event domain information "System Events" have been included in the normalized event information listing of Table 2.

TABLE 3

Event: Logon_FAILURE
Event Category: Authentication
Event Domain: System Events
OperatingSystem: NT
HostName: US-VICH-XP
FailureReason: Unknown user name or bad password
User Name: vich
Domain: company
Logon Type: 7
Logon Process: User32
Authentication Package: Negotiate
Workstation Name: US-VICH-XP]

The event input manager 304 provides the processed event information to the SIEM module 302 after processing the received event information by normalization and assignment of category and/or domain information. The SIEM module 302 may analyze the processed event information to perform event correlation, event notification, interactive event management, and other functions typically performed by conventional SIEM systems (step 404). The SIEM module 302 updates the visualization database 305 to update domain and category dictionaries, metadata, normalization rules, and other information (step 405). The SIEM module 302 stores the processed event information in the event log 306 (step 406).

The event log 306 and the visualization database 305 may be implemented using a commercially available database, table, or other listing. The event log 306 may be queried to obtain query results that may be presented using one or more visualizations.

Figure 5:
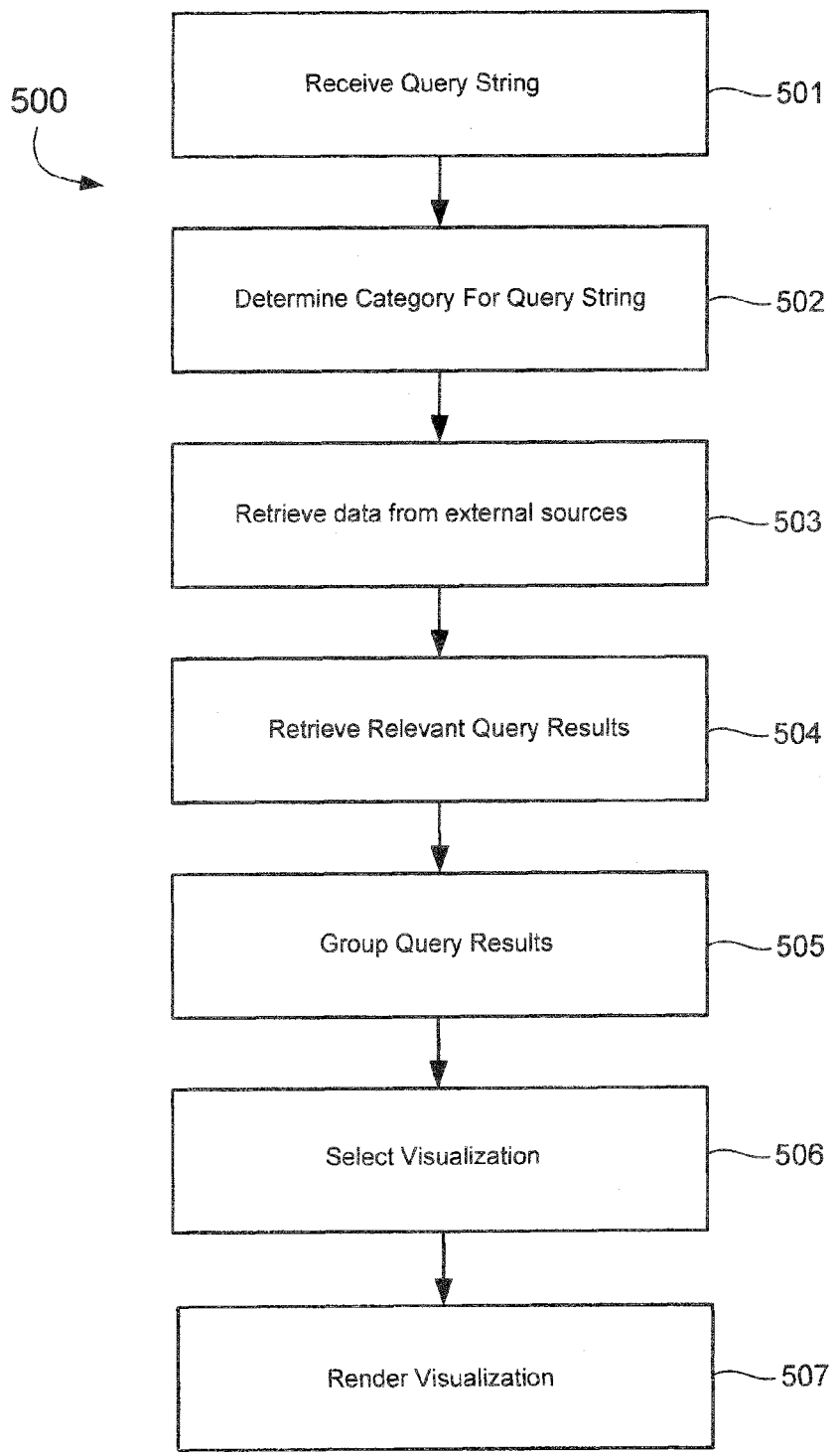
FIG. 5 shows a flow diagram of a method of retrieving data from an event log in accordance with an embodiment of the present invention.

FIG. 5 shows a flow diagram of a method 500 of retrieving data from the event log 306 in accordance with an embodiment of the present invention. The method 500 may be performed by the SIEM module 302. In the method 500, the SIEM module 302 receives a query string (step 501). The query string may be for a request for particular event information. The SIEM module 302 may receive the query string from another program (e.g., as a parameter of a function call) or from a computer human interface, such as a keyboard. For example, a user may query the event log 306 by using a keyboard to enter a keyword or time period that he is interested in. As can be appreciated, each user may have a particular interest or point of view in analyzing event information. As a particular example, one user may be interested in the effect of a particular virus on the computer network, while another user may be interested in statistics of another user. As another example, another user may be interested in event information for a particular time period (e.g., current day or for the last two days). A particular user may thus request for particular event information by using the appropriate query string(s).

The SIEM module 302 determines a category for the query string (step 502). The query string may designate search of columns. That is, the query string may designate a particular category or field. For example, a query string "user:John" may designate a request for all event information concerning users whose name include "John." As another example, the query string "timeline:02032010-02042010" may designate a request for all event information having a timestamp of Feb. 3, 2020 to Feb. 4, 2010. Yet another example, the query string "badwebsite.com" may designate a request for all event information for the domain "badwebsite.com."

If the query string does not designate a column, the SIEM module 302 may parse the query string to extract column information from the query string, such as by performing dictionary lookup or linguistics analysis. The visualization database 305 or external source may include a dictionary indicating correspondence between words and corresponding category or field. Parsed words from a query string may be looked up in the dictionary to determine its category or field. For example, a dictionary may indicate that "worm_sasser" is the name of a computer virus. When a query string includes "worm_sasser", the SIEM module 302 may perform a dictionary look up to determine that "worm_sasser" is the name of a virus, and perform a corresponding category search in the event log 306. Instead of using a dictionary, the SIEM module 302 may also perform a text search for a particular query string. To continue the example, the SIEM module 302 may run a full text search for "worm_sasser" in the event log 306 to look for meta information of a column containing "worm_sasser." If category information cannot be obtained directly from a query string, category information may also be obtained by grouping corresponding query results by category.

Category information determined from query strings may be employed to group relevant visualizations. Category information determined from query results, and also from query strings, may be employed to select the most appropriate visualization from among the relevant visualizations.

As can be appreciated from the foregoing, the SIEM module 302 may query the event log 306 for a particular category. This allows for retrieval of targeted information for that category, or domain if the query string indicates a domain. Once the SIEM module 302 determines that the query string is for a particular category, the SIEM module may retrieve relevant data for that category from external sources (step 503). For example, the SIEM module 302 may perform a service principal name (SPN) query, directory access using the lightweight directory access protocol (LDAP), get search results from an external search engine, and so on.

As a particular example, once the SIEM module 302 determines that the query is for the category "virus," the SIEM module 302 may retrieve corresponding virus information from the Trend Micro virus encyclopedia to provide an answer to what the virus is. For the category "user_name", the SIEM module 302 may retrieve the user information form a directory server, such as MS Active Directory. For a domain name, the SIEM module 302 may obtain domain information from the WhoIs database.

The SIEM module 302 retrieves relevant query results from the event log 306 (step 504). The SIEM module 302 may use the category of the query string to retrieve targeted event information from the event log 306. That is, the SIEM module 302 may search the event log 306 for all event information having the category of the query string. As a particular example, if the query string is of the category "viruses", the SIEM module 302 may retrieve all virus related event information. If the query string also includes a timeline, the SIEM module 302 may retrieve all virus related event information within the timeline. The SIEM module 302 may also retrieve relevant query results by direct search (e.g., by text matching, linguistics analysis) using the query string, rather than using the category of the query string.

The relevant query results may be grouped according to their respective categories (step 505). For example, query results pertaining to category Event Type (for types of security events) may be grouped together, query results pertaining to category malware may be grouped together, etc.

A visualization is selected for the retrieved relevant data (step 506), which in this example includes relevant event information and/or retrieved external data. In one embodiment, the SIEM module 302 provides the retrieved relevant data to the recommendation engine 303, which selects one or more visualizations from a plurality of available visualizations by calculating an importance score for the visualizations based on the retrieved relevant data, and then sorting the visualizations by their importance scores. The recommendation engine 303 may select the visualization or visualizations based on their importance scores. The recommendation engine 303 provides the selected visualizations to the SIEM module 302.

As an example, if the query string has the "virus" category, the available visualizations may comprise presentation formats showing (a) infection count (local versus global for a certain period), (b) infection sources (local versus global), (c) global infection map, (d) company infection map, and (e) infection by operating system (local versus global). As another example, if the query string has the "user" category, the available visualizations may comprise presentation formats showing (a) network bandwidth utilization, (b) user versus company for a certain period, (c) Infection count (user versus company versus company for a certain period), (d) Infection by protocol (user versus company), and (e) traffic by protocol (user versus group versus company). As another example, if the query string has the "URL" (uniform resource locator) category, the available visualizations may comprise presentation formats showing (a) traffic statistics (company versus global for a certain period), (b) user group statistics, (c) violation percentage for a certain period, and (d) infection percentage for a certain period.

The SIEM module 302 renders the selected visualizations using the retrieved relevant data (step 507).

Figure 6:
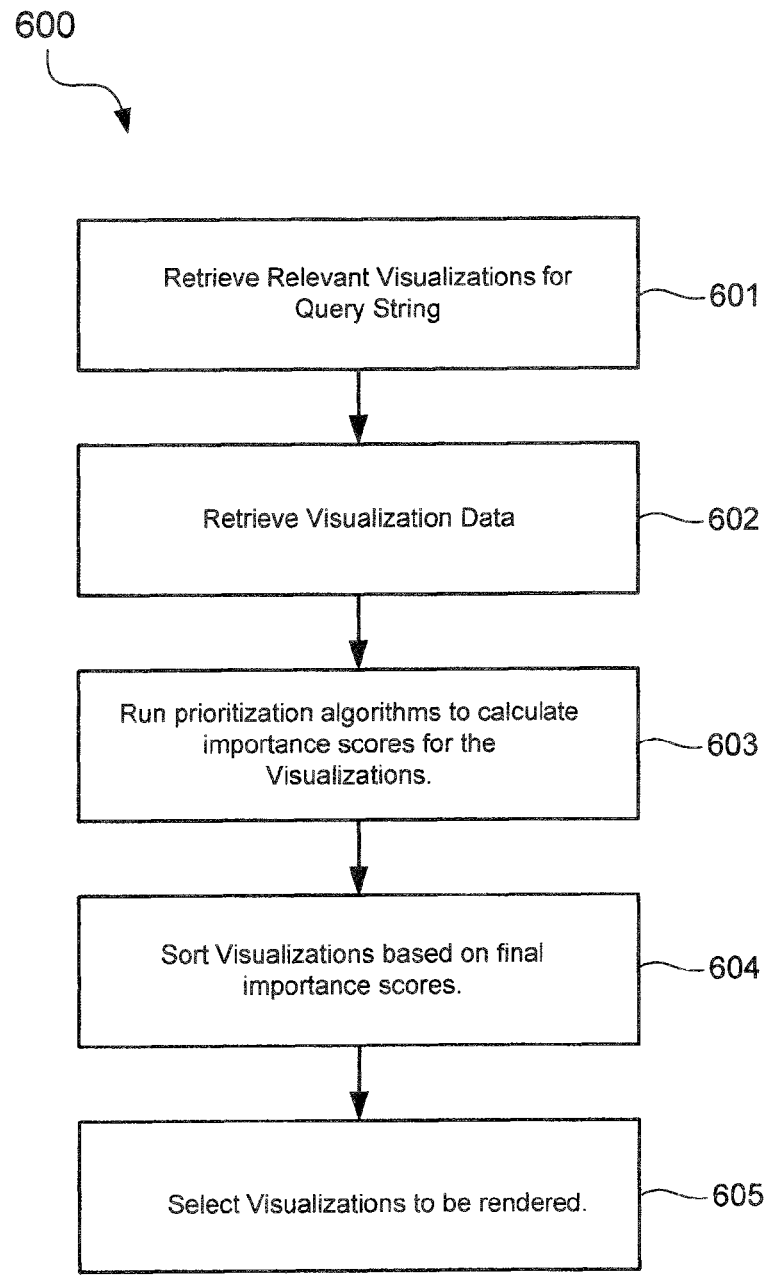
FIG. 6 shows a flow diagram of a method of automatically selecting one or more visualizations from a plurality of visualizations for rendering event information and other relevant data in accordance with an embodiment of the present invention.

FIG. 6 shows a flow diagram of a method 600 of automatically selecting one or more visualizations among a plurality of visualizations for rendering event information and other relevant data in accordance with an embodiment of the present invention. The method 600 may be performed by the recommendation engine 303 to implement step 506 of the method 500 for the SIEM module 302. As can be appreciated, the method 600 may also be used to select a format for presenting information in other suitable applications.

In the method 600, the recommendation engine 303 retrieves relevant visualizations for a query string (step 601). Available visualizations stored in the visualization database 305 may have meta information indicating relevant, associated categories. To limit the number of visualization to be evaluated, the recommendation engine 303 may retrieve only those visualizations that are relevant to the category of interest.

The recommendation engine 303 retrieves the visualization data that will be presented by the relevant visualizations (step 602). In this example, the visualization data comprise retrieved relevant data received by the recommendation engine 303 from the SIEM module 302.

The recommendation engine 303 may employ a plurality of prioritization algorithms for evaluating input data. For example, the recommendation engine 303 may include the following algorithms to be used for prioritization:

(a) Deviation of data within the result data set, e.g. counting by user report with a user having more counts than other users in the set.

(b) Percent change from previous runs of a report for the visualization.

(c) Percent change from average or baseline.

The recommendation engine 303 may also prioritize by scoring certain types of results higher. For example, some users may be interested to see event information based on their work profile or location. As a particular example, an endpoint administrator may want to see more event information about endpoint computers rather than gateways. Other customization algorithms may also be used to calculate an importance score for a visualization.

Each of the selected visualizations uses some combination of the visualization data. In other words, some of the retrieved event information may be applicable to some visualizations but not to others. Accordingly, each visualization may require computation of one or more of the prioritization algorithms. Using the processor of the event server computer, the prioritization algorithms for a visualization may be run using retrieved event information for that visualization. For each prioritization algorithm, an importance score normalized across the priority algorithms may be assigned to the visualization being evaluated based on the result of the algorithm computation. For example, a particular visualization presenting a standard deviation of infection count for a particular virus may be assigned an importance score by calculating the standard deviation of the visualization data for the particular visualization.

The recommendation engine 303 sorts the visualizations based on their final importance scores (step 604). A final importance score of a visualization may be the total of all importance scores or the final adjusted importance scores for that visualization using the priority algorithms.

The visualizations with the best important scores may be selected for rendering (step 605). For example, the visualization with the highest final importance score or the top n visualizations based on final importance scores may be selected for rendering.

Figure 7:
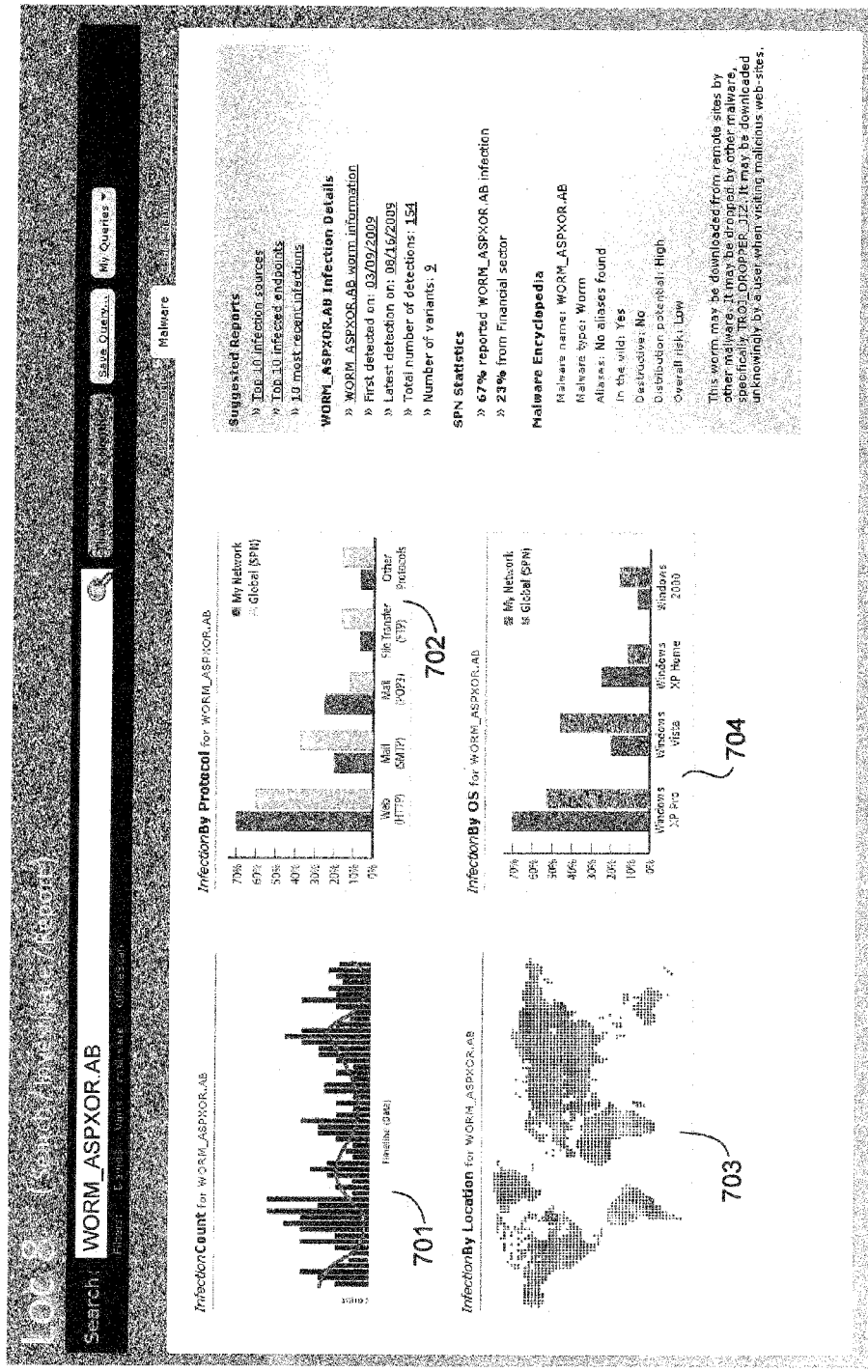
FIGS. 7 and 8 show example renderings of visualizations that may be automatically selected using embodiments of the present invention.
Figure 8:
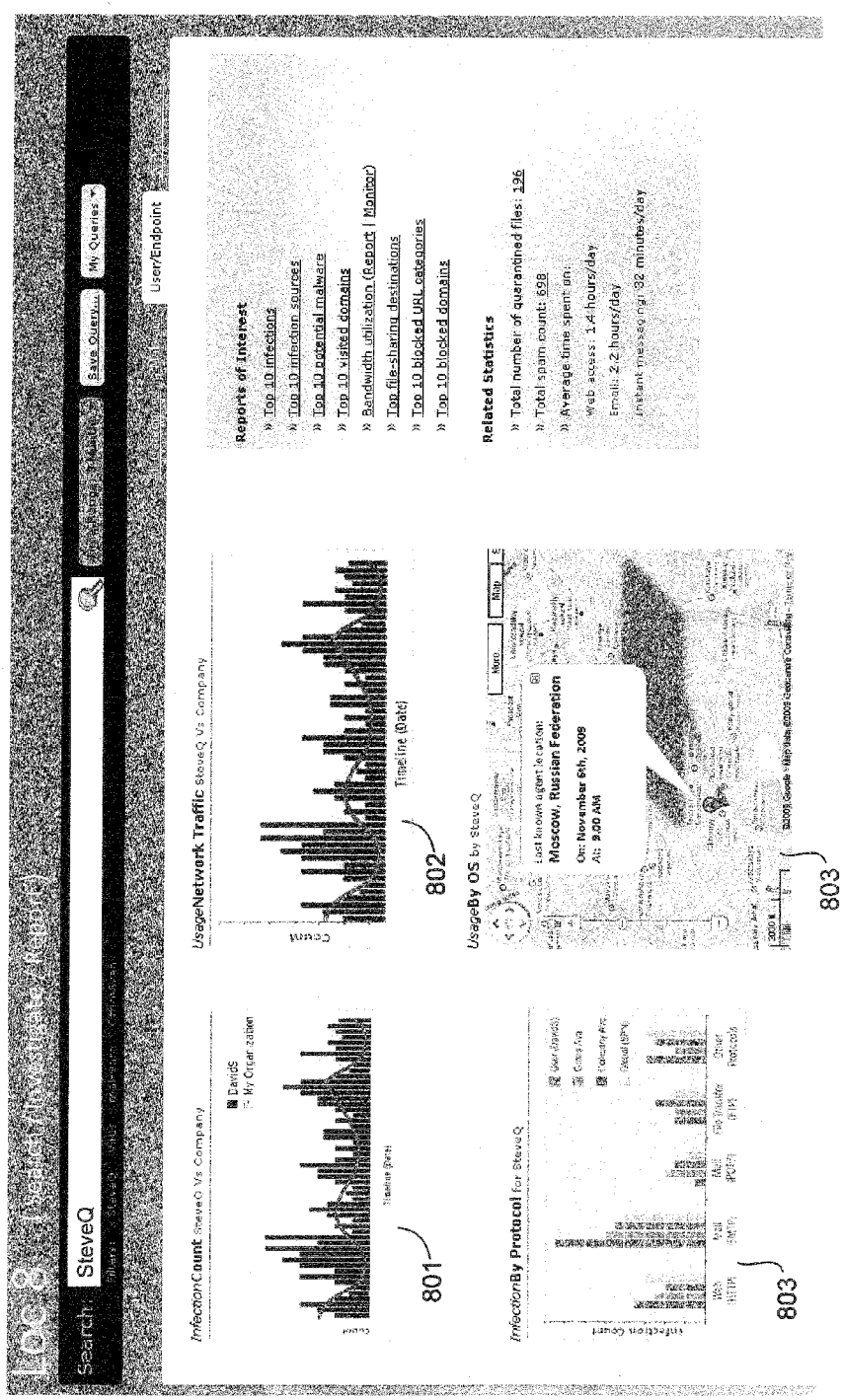

FIGS. 7 and 8 show example renderings of visualizations that may be automatically selected using embodiments of the present invention. In the example of FIG. 7, a user entered the query string "worm_ASPXOR.AB" in a user interface for generating reports. The SIEM module 302 determined the query string as having a category "viruses." The SIEM module 302 retrieves relevant event information for the category "viruses" from the event log 306. Using the relevant event information, the recommendation engine 303 selected the visualizations corresponding to the graphs 701, 702, 703, and 704 for rendering.

In the example of FIG. 8, the SIEM module 302 determined that the query string "SteveQ" is under the category "user." The SIEM module 302 retrieves relevant event information for the category "user" and for SteveQ in particular. Using the relevant event information, the recommendation engine 303 selected the visualizations corresponding to the graphs 801, 802, 803, and 804 for rendering. The graphs 801-803 may be from event information stored in the event log 306, while the graph 804 may be from data retrieved from an external source, which is Google Maps in this example.

Figure 9:
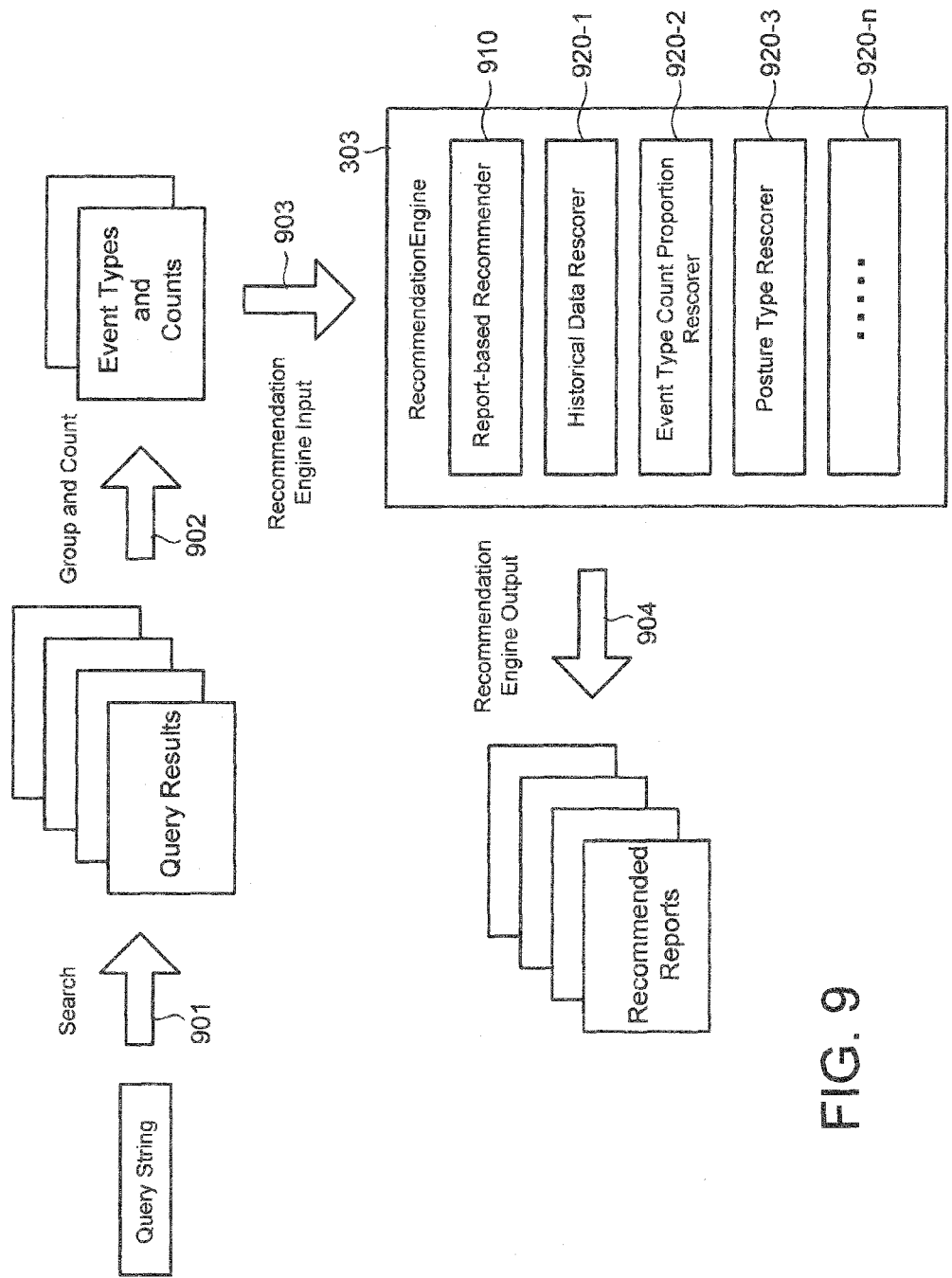
FIG. 9 schematically illustrates a method of automatically selecting a visualization among a plurality of visualizations in accordance with the embodiment of the present invention.

FIG. 9 schematically illustrates a method of automatically selecting a visualization among a plurality of visualizations in accordance with the embodiment of the present invention. The method may be performed by the SIEM system 300 (see FIG. 3). In the example of FIG. 9, the SIEM module 302 receives a query string to be used for searching the event log 306 for relevant event information. The search yielded a plurality of query results responsive to the query string (see arrow 901). The SIEM module 302 organizes the query results into different groups and provides one or more counts for each group (arrow 902).

In the example of FIG. 9, the SIEM module 302 organizes the query results into groups having the category "Event Types", which comprise event information pertaining to predetermined types of events. The category Event Types may have subcategories, which in the example of FIG. 9 are "Cleaned Violation" and "Uncleanable Violation." Event information having the subcategory Cleaned Violation indicates detection of computer virus infected file that have been subsequently cleaned, whilst Uncleanable Violation indicates detection of computer virus infected file that cannot be cleaned. Event information for Cleaned Violation and Uncleanable Violation event types may be generated by an antivirus that detected and tried to clean the infected file. As can be appreciated, event information for Cleaned Violation and Uncleanable Violation event types may also be generated by other data sources 307. For example, an intrusion detector configured to detect and purge an intruder may generate event information for a Cleaned Violation upon detection and purging of an intruder or for an Uncleanable Violation upon detection of an intrusion that cannot be traced.

As a particular example, Table 4 shows query results grouped under the category Event Types.

TABLE 4

| Machine | Date | File | Action | Event Type |
|---|---|---|---|---|
| 10.2.1.12 | Mar. 3, 2010 12:12 PM | Virus.dat | Cleaned | Cleaned Violation |
| 10.2.3.23 | Mar. 3, 2010 12:30 PM | Uncleanable.doc | Deleted | Uncleanable Violation |
| 10.2.3.43 | Mar. 4, 2010 4:39 PM | Large_file.zip | Deleted | Uncleanable Violation |
| 10.2.1.12 | Apr. 5, 2010 10:34 AM | infectedFile.exe | Deleted | Uncleanable Violation |

In the example of Table 4, there are four event information under the category Event Type. Table 5 shows the count of Cleaned Violations and Uncleanable Violations under the category Event Type.

TABLE 5

| Event Type | Count |
|---|---|
| Cleaned Violation | 1 |
| Uncleanable Violation | 3 |

The recommendation engine 303 receives the group of event information for Event Type (see arrow 903). The recommendation engine 303 also receives the counts of event information for Cleaned Violation and Uncleanable Violation.

The visualizations in the example of FIG. 9 comprise the following reports: Top 10 Violations, Top 10 Uncleanable Violation, Top 10 Users with Violations, Top 10 Cleaned Files, and Top 10 Downloaded Files. Each visualization may be relevant to one or more associated categories. In the example of FIG. 9, each report (visualization) includes one or more associated event types (category) shown in Table 6.

TABLE 6

| Report | Associated Event Type | Importance Score |
|---|---|---|
| Top 10 Violations | Cleaned Violation, Uncleanable Violation | 1.0 |
| Top 10 Uncleanable Violation | Uncleanable Violation | 1.0 |
| Top 10 Users with Violations | Cleaned Violation, Uncleanable Violation | 1.0 |
| Top 10 Cleaned Files | Cleaned Violation | 1.0 |
| Top 10 Downloaded Files | Cleaned Violation, Uncleanable Violation | 0.3 |

In the example of FIG. 9, the recommendation engine 303 comprises a report-based recommender 910, and a plurality of prioritization algorithms 920 (i.e., 920-1, 920-2, 920-3, . . . ,920-n). In the example of FIG. 9, the prioritization algorithm 920-1 is a historical data rescorer, the prioritization algorithm 920-2 is an event type count proportion rescorer, and the prioritization algorithm 920-3 is a posture type rescorer. Additional or other prioritization algorithms may also be used depending on the application.

The report based recommender retrieves from the visualization database 305 those reports that are relevant to the category of interest. In this example, the category of interest is Event Types, which include Cleaned Violation and Uncleanable Violation. Each visualization may include metadata identifying associated categories. The example of Table 6 shows relevant reports, which are those associated with Cleaned Violation, Uncleanable Violation, or both. The report based recommender calculates an importance score for each relevant report based on how related the report is to the categories of interest. In the example of Table 6, the report based recommender assigns an importance score that ranges from 0.0 to 1.0, with a higher score indicating a stronger correlation. In this example, though there are many available reports, any report that has no association with the event types is not returned to minimize the number of reports to be evaluated. Reports evaluated by the report based recommender as having an importance score equal or greater than a threshold number are deemed to be relevant reports. As will be more apparent below, the importance scores are subsequently adjusted using prioritization algorithms 920.

The historical data rescorer (prioritization algorithm 920-1) adjusts the importance scores of the relevant reports based on the statistical daily average in the organization for the given event types. The historical data rescorer may adjust the importance score based on historical deviation of the associated category, which in this example is event type, used by the report. As a particular example, assume that the count of Cleaned Violations is usually 3 and the count of Uncleanable Violations is usually 1. With a deviation set at 20%, any count above or below this deviation will have the importance score of the report adjusted. After rescoring using the historical data rescorer, the importance scores of the reports of Table 6 may be adjusted as shown in Table 7.

TABLE 7

| Report | Associated Event Type | Importance Score |
|---|---|---|
| Top 10 Violations | Cleaned Violation, Uncleanable Violation | 1.5 |
| Top 10 Uncleanable Violation | Uncleanable Violation | 1.5 |
| Top 10 Users with Violations | Cleaned Violation, Uncleanable Violation | 1.5 |
| Top 10 Cleaned Files | Cleaned Violation | 0.5 |
| Top 10 Downloaded Files | Cleaned Violation, Uncleanable Violation | 0.5 |

In the example Table 7, because the number of Uncleanable Violations is significantly above the average, the corresponding report importance scores are increased from their values in Table 6. On the other hand, because the number of Cleaned Violations is below the average, the corresponding report importance scores are decreased.

The event type count proportion rescorer (prioritization algorithm 920-2) adjusts the report importance scores based on the proportion of the event types in the query results. The higher the proportion of a particular event type in the query results, the higher the importance score will be increased. Continuing the example, because Uncleanable Violations comprise a more significant number of the query results (see Table 5), the corresponding importance scores will be increased. Table 8 shows the result of adjusting the report importance scores of Table 7 to take into account the higher proportion of Uncleanable Violations compared to Cleaned Violation in the query results.

TABLE 8

| Report | Associated Event Type | Importance Score |
|---|---|---|
| Top 10 Violations | Cleaned Violation, Uncleanable Violation | 1.8 |
| Top 10 Uncleanable Violation | Uncleanable Violation | 1.8 |
| Top 10 Users with Violations | Cleaned Violation, Uncleanable Violation | 1.8 |

TABLE 8-continued

| Report | Associated Event Type | Importance Score |
|---|---|---|
| Top 10 Cleaned Files | Cleaned Violation | 0.5 |
| Top 10 Downloaded Files | Cleaned Violation, Uncleanable Violation | 0.7 |

The posture type rescorer (prioritization algorithm 920-3) adjusts the report importance scores based on posture types. In one embodiment, the posture type rescorer adjusts the importance scores depending on the severity or significance of the security event. In this example, because all event information constitutes significant security violations, the importance scores are adjusted in the same manner. If a report uses event information that is less significant, the importance score of that report would be decreased. Table 9 shows the result of adjusting the report importance scores of Table 8 based on posture types.

TABLE 9

| Report | Associated Event Type | Importance Score |
|---|---|---|
| Top 10 Violations | Cleaned Violation, Uncleanable Violation | 1.9 |
| Top 10 Uncleanable Violation | Uncleanable Violation | 1.9 |
| Top 10 Users with Violations | Cleaned Violation, Uncleanable Violation | 1.9 |
| Top 10 Cleaned Files | Cleaned Violation | 0.55 |
| Top 10 Downloaded Files | Cleaned Violation, Uncleanable Violation | 0.8 |

The importance score of the reports after running the last prioritization algorithm may be deemed the final importance score. In this example, the final importance scores are those in Table 9. The recommendation engine 303 sorts the final importance scores from highest to lowest to rank the reports. Table 10 shows the result of sorting the reports of Table 9 by final importance score.

TABLE 10

| Report | Score |
|---|---|
| Top 10 Violations | 1.9 |
| Top 10 Uncleanable Violation | 1.9 |
| Top 10 Users with Violations | 1.9 |
| Top 10 Downloaded Files | 0.8 |
| Top 10 Cleaned Files | 0.55 |

The recommendation engine 303 outputs the recommended reports (see arrow 904) to the SIEM module 302. For example, the recommendation engine 303 may output the top n reports, which in the example of Table 10 with n=3 results in recommending the reports Top 10 Violations, Top 10 Uncleanable Violation, and Top 10 Users with Violations. The SIEM module 302 receives the recommended reports for rendering as graphs, similar to those shown in FIGS. 7 and 8.

As can be appreciated from the foregoing, embodiments of the present invention provide advantages heretofore unrealized. First, embodiments of the present invention allow for automatic selection of the most relevant visualizations even in the presence of voluminous amounts of event information. Second, embodiments of the present invention allow for automatic retrieval of event information for a particular category. Third, embodiments of the invention allow for presentation of information that is tailored to particular users.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of to be executed by an event server computer programmed to select a visualization from a plurality of visualizations for presenting event information, the event server computer comprising a processor and a memory, the method comprising:

receiving a plurality of event information from a plurality of sources over a computer network, the plurality of event information being indicative of computer security threat;

assigning categories to the plurality of event information;

storing the plurality of event information in an event log;

receiving a query string;

determining a category of the query string;

retrieving relevant visualizations from the plurality of visualizations based on the category of the query string;

retrieving from the event log event information corresponding to the category;

automatically selecting a first visualization from the retrieved relevant visualizations based on the retrieved event information, the first visualization being selected for rendering at least some of the plurality of event information stored in the event log by: (a) executing a plurality of algorithms using corresponding event information of the first visualization, (b) calculating an importance score for the first visualization for each executed algorithm in the plurality of algorithms, and (c) ranking the first visualization relative to other visualizations in the retrieved relevant visualizations based on the importance score of the first visualization for each of the executed algorithms;

rendering the first visualization to display at least some of the event information stored in the event log and additional information retrieved from an external source over the Internet based on the category of the query string;

automatically selecting a second visualization from the plurality of visualizations based on the retrieved event information; and rendering the first and second visualizations, wherein rendering the first visualization comprises rendering a graph of virus infection count over time and wherein the plurality of algorithms include standard deviation.

2. The method of claim 1 further comprising:

for the other visualizations in the retrieved relevant visualizations: (a) executing the plurality of algorithms using corresponding event information of the other visualizations, (b) calculating importance scores for the other visualizations, and (c) ranking the other visualizations relative to one another and including the first visualization based on their respective importance scores.

* * * * *